US011488137B2

United States Patent
Sandberg et al.

(10) Patent No.: US 11,488,137 B2
(45) Date of Patent: Nov. 1, 2022

(54) COMPUTERIZED METHOD, COMMUNICATION SYSTEM AND COMPUTER PROGRAMS FOR EFFICIENT HANDLING OF MOBILE COMMERCE

(71) Applicant: PEJ AB, Malmö (SE)

(72) Inventors: Victor Sandberg, Malmö (SE); Marcus Johansson, Lund (SE)

(73) Assignee: PEJ AB, Malmö (SE)

( * ) Notice: Subject to any disclaimer, the term of this patent is extended or adjusted under 35 U.S.C. 154(b) by 266 days.

(21) Appl. No.: 16/643,266

(22) PCT Filed: Aug. 29, 2018

(86) PCT No.: PCT/SE2018/050864
§ 371 (c)(1),
(2) Date: Feb. 28, 2020

(87) PCT Pub. No.: WO2019/045624
PCT Pub. Date: Mar. 7, 2019

(65) Prior Publication Data
US 2020/0265412 A1    Aug. 20, 2020

(30) Foreign Application Priority Data
Sep. 1, 2017  (SE) .................................. 1751061-1

(51) Int. Cl.
*G06Q 20/32*    (2012.01)
*G06Q 20/40*    (2012.01)
(Continued)

(52) U.S. Cl.
CPC ....... *G06Q 20/3224* (2013.01); *G06Q 20/108* (2013.01); *G06Q 20/204* (2013.01);
(Continued)

(58) Field of Classification Search
CPC ........... G06Q 20/3224; G06Q 20/4015; G06Q 20/108; G06Q 20/204; G06Q 20/327;
(Continued)

(56) References Cited

U.S. PATENT DOCUMENTS 7,600,676 B1 * 10/2009 Rados ................... G06Q 20/40
235/380
8,352,315 B2 * 1/2013 Faith ..................... G06Q 30/02
705/14.1
(Continued)

FOREIGN PATENT DOCUMENTS

EP            3109817 A1    12/2016

OTHER PUBLICATIONS

Ma, Di, et al. "Location-aware and safer cards: enhancing RFID security and privacy via location sensing." IEEE transactions on dependable and secure computing 10.2 (2012): 57-69. (Year: 2012).*
(Continued)

*Primary Examiner* — Asfand M Sheikh
(74) *Attorney, Agent, or Firm* — Capitol City TechLaw

(57) ABSTRACT

A computerized method (200) of performing a purchase and an associated communication system are disclosed. A customer mobile computing device (CMCD) communicates (210) with a server computing device (SCD) to generate an order for the purchase. The server computing device (SCD) communicates (220) with a payment processor computing device (PPCD) to perform a first part of a payment transaction for the purchase, wherein the first part of the payment transaction involves reserving funds for the purchase. A merchant computing device (MCD) performs (230) a digital handshake procedure with the customer mobile computing device (CMCD). The digital handshake procedure involves short-range wireless data communication to verify spatial proximity between the customer mobile computing device
(Continued)

(CMCD) and the merchant computing device (MCD). When spatial proximity has been verified, the merchant computing device (MCD) communicates (240) with the server computing device (SCD) to accept the order. The server computing device (SCD) communicates (250) with the payment processor computing device (PPCD) to perform a second part of the payment transaction, wherein the second part of the payment transaction involves capturing funds for the purchase.

14 Claims, 6 Drawing Sheets

(51) Int. Cl.
*G06Q 20/10* (2012.01)
*G06Q 20/20* (2012.01)
*G06Q 30/06* (2012.01)
*H04W 12/06* (2021.01)
*H04W 12/63* (2021.01)
*G06Q 20/36* (2012.01)

(52) U.S. Cl.
CPC ....... *G06Q 20/327* (2013.01); *G06Q 20/3672* (2013.01); *G06Q 20/4014* (2013.01); *G06Q 20/4015* (2020.05); *G06Q 30/0635* (2013.01); *H04W 12/06* (2013.01); *H04W 12/63* (2021.01)

(58) Field of Classification Search
CPC .......... G06Q 20/3672; G06Q 20/4014; G06Q 30/0635; H04W 12/63; H04W 12/06
See application file for complete search history.

(56) References Cited

U.S. PATENT DOCUMENTS

| | | | | |
|---|---|---|---|---|
| 8,401,970 | B1* | 3/2013 | Patel | G06Q 20/40 705/44 |
| 10,027,501 | B1* | 7/2018 | Watson | H04L 12/4625 |
| 2005/0102211 | A1 | 5/2005 | Freeny, Jr. | |
| 2010/0198725 | A1 | 8/2010 | Naccache | |
| 2010/0276484 | A1* | 11/2010 | Banerjee | G06Q 30/06 235/379 |
| 2011/0000962 | A1 | 1/2011 | Chan et al. | |
| 2012/0016731 | A1 | 1/2012 | Smith et al. | |
| 2013/0103574 | A1* | 4/2013 | Conrad | G06Q 20/36 705/39 |
| 2013/0124411 | A1* | 5/2013 | Kobres | G07F 19/20 705/43 |
| 2013/0282588 | A1* | 10/2013 | Hruska | G06Q 20/40 705/67 |
| 2014/0025576 | A1* | 1/2014 | Esch | G06Q 20/20 705/44 |
| 2014/0074714 | A1* | 3/2014 | Melone | G06Q 20/00 705/44 |
| 2016/0063435 | A1 | 3/2016 | Shah et al. | |
| 2016/0063477 | A1* | 3/2016 | Egan | G07G 1/0027 455/406 |
| 2016/0071087 | A1 | 3/2016 | Mittal | |
| 2016/0092874 | A1* | 3/2016 | O'Regan | G06Q 20/3221 705/44 |
| 2016/0232515 | A1* | 8/2016 | Jhas | G06Q 30/06 |
| 2016/0244311 | A1* | 8/2016 | Burks | G06Q 20/18 |
| 2017/0061405 | A1 | 3/2017 | Bryant | |
| 2017/0061466 | A1* | 3/2017 | Srivastava | G06Q 20/3278 |
| 2017/0091764 | A1 | 3/2017 | Lloyd et al. | |
| 2017/0308883 | A1* | 10/2017 | Black | G06Q 20/206 |
| 2018/0047000 | A1* | 2/2018 | Kuchenski | G06Q 20/1085 |
| 2018/0165663 | A1* | 6/2018 | Naik | G06Q 20/3223 |

OTHER PUBLICATIONS

Saxena, Ashutosh, Manik Lal Das, and Anurag Gupta. "MMPS: a versatile mobile-to-mobile payment system." International Conference on Mobile Business (ICMB'05). IEEE, 2005. (Year: 2005).*
Youtube video file available on the internet at https://www.youtube.com/watch?v=DIT-bhWqt70&t=200s, uploaded by youtube user HGMM on Jul. 1, 2015.

* cited by examiner

200 — A computerized method of performing a purchase

210
A customer mobile computing device (CMCD) communicating with a server computing device (SCD) to generate an order for the purchase

220
The server computing device (SCD) communicating with a payment processor computing device (PPCD) to perform a first part of a payment transaction for the purchase (e.g. reserving funds)

230
A merchant computing device (MCD) performing a digital handshake procedure with the customer mobile computing device (CMCD), the digital handshake procedure involving short-range wireless data communication to verify spatial proximity between the customer mobile computing device (CMCD) and the merchant computing device (MCD)

240
When spatial proximity has been verified, the merchant computing device (MCD) communicating with the server computing device (SCD) to accept the order

250
The server computing device (SCD) communicating with the payment processor computing device (PPCD) to perform a second part of the payment transaction (e.g. capturing funds)

*Fig 2*

COMPUTERIZED METHOD, COMMUNICATION SYSTEM AND COMPUTER PROGRAMS FOR EFFICIENT HANDLING OF MOBILE COMMERCE

This application claims priority under 35 USC 119(a)-(d) to SE patent application No. 1751061-1, which was filed on Sep. 1, 2017, the entire contents of which are incorporated herein by reference.

TECHNICAL FIELD

The present invention generally relates to the field of mobile commerce, and more particularly to a computerized method, communication system and computer programs for efficient handling of mobile commerce.

BACKGROUND

Mobile commerce is rapidly growing. Mobile devices have been frequently used for quite some years already by people who wish to shop on the Internet. In these situations, the mobile devices are used both as tools for selecting and ordering goods or services, and as tools for paying for the ordered goods or services.

When it comes to real-life commerce (i.e. people buying goods or services from merchants at a physical point of sale or pick-up point at a shop, supermarket, service provider, event venue, etc), the community has been a bit more conservative. Conventionally, a customer "manually" places an order either by bringing order items collected during a stroll in the premises (e.g. groceries, clothing) to a physical point of sale or pick-up counter, or by telling a shop assistant at the point of sale or pick-up counter which order items he wishes to purchase. The purchase is then paid for by cash or credit card at the point of sale or pick-up counter.

Some attempts have been made to use mobile devices (particularly smart phones) as a tool for placing an order "digitally" before physically approaching the point of sale or pick-up counter to collect the order items. Moreover, some attempts have been made to use mobile devices (again, particularly smart phones) as a tool for paying for such a purchase.

However, existing solutions are designed and dimensioned with a one-to-one perspective of the relation between customer and merchant (an individual customer using his mobile device for placing an order and/or paying for the order at a single point of sale or pick-up counter at the merchant). These solutions may work fine for low volume commerce where single or a just a few customers place orders and make payments directed at a single point of sale or pick-up counter at the merchant. However, the situation becomes much more challenging when scaled up to massive commerce by tens, hundreds or even thousands of concurrent customers visiting for instance an event venue or a large supermarket having a plurality of points of sale or pick-up counters.

One particular challenge identified by the present inventors is the risk of bottlenecks at the different points of sale or pick-up counters at the venue. If many customers use their mobile devices to place orders at essentially the same time and directed at the same particular point of sale or pick-up counter, there will likely be delays and growing waiting lines when the customers go to the particular point of sale or pick-up counter to pay for the order and pick up the order items.

Another challenge identified by the present inventors is the risk of user annoyance if a purchase is paid for in the customer's mobile device already when placing the order, but the user for some reason then fails to actually receive or retrieve the order items already paid for. This may happen for instance if the customer places an order to be collected at a particular point of sale or pick-up counter at the venue but then by mistake or confusion goes to another point of sale or pick-up counter at the venue. Similarly, this may happen if the particular point of sale or pick-up counter at the venue suddenly runs empty of one or more of the order items, for instance because of an unexpected peak in demand for a certain order item by many users targeting the particular point of sale or pick-up counter.

SUMMARY

It is accordingly an object of the invention to remedy or at least mitigate one or more of the challenges identified above.

A first aspect of the present invention is a computerized method of performing a purchase. The method comprises:

a customer mobile computing device communicating with a server computing device to generate an order for the purchase;

the server computing device communicating with a payment processor computing device to perform a first part of a payment transaction for the purchase, wherein the first part of the payment transaction involves reserving funds for the purchase;

a merchant computing device performing a digital handshake procedure with the customer mobile computing device, the digital handshake procedure involving short-range wireless data communication to verify spatial proximity between the customer mobile computing device and the merchant computing device;

when spatial proximity has been verified, the merchant computing device communicating with the server computing device to accept the order; and the server computing device communicating with the payment processor computing device to perform a second part of the payment transaction, wherein the second part of the payment transaction involves capturing funds for the purchase.

A second aspect of the present invention is a computer program comprising program instructions for causing performance of the functionality of the customer mobile computing device in the method according to the first aspect when said program instructions are executed by a processing unit.

A third aspect of the present invention is a computer program comprising program instructions for causing performance of the functionality of the merchant computing device in the method according to the first aspect when said program instructions are executed by a processing unit.

A fourth aspect of the present invention is a computer program comprising program instructions for causing performance of the functionality of the server computing device in the method according to the first aspect when said program instructions are executed by a processing unit.

A fifth aspect of the present invention is a computer program comprising program instructions for causing performance of the functionality of the payment processor computing device in the method according to the first aspect when said program instructions are executed by a processing unit.

A sixth aspect of the present invention is a communication system comprising a customer mobile computing device, a merchant computing device, a server computing device and a payment processor computing device.

The customer mobile computing device and the server computing device are configured for communicating to generate an order for the purchase.

The server computing device and the payment processor computing device are configured for communicating to perform a first part of a payment transaction for the purchase, wherein the first part of the payment transaction involves reserving funds for the purchase.

The merchant computing device and the customer mobile computing device are configured for performing a digital handshake procedure, the digital handshake procedure involving short-range wireless data communication to verify spatial proximity between the customer mobile computing device and the merchant computing device.

The merchant computing device and the server computing device are configured, when spatial proximity has been verified, for communicating to accept the order.

The server computing device and the payment processor computing device are configured for communicating to perform a second part of the payment transaction, wherein the second part of the payment transaction involves capturing funds for the purchase.

Accordingly, the present invention provides a computerized method, a communication system and computer programs for efficient handling of mobile commerce.

Still other aspects and features of the invention and its embodiments are defined by the appended patent claims and are further explained, together with problems solved and advantages obtained, in the detailed description section as well as in the drawings. For instance, in an advantageous embodiment, the server computing device or the payment processor computing device is configured for detecting a timeout if the second part of the payment transaction is not performed, and for cancelling the first part of the payment transaction by removing the reservation of funds.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Objects, features and advantages of embodiments of the invention will appear from the following detailed description, reference being made to the accompanying drawings.

FIG. 2 is a flowchart diagram illustrating a computerized method of performing, a purchase generally according to the invention.

DETAILED DESCRIPTION

Figure 1:
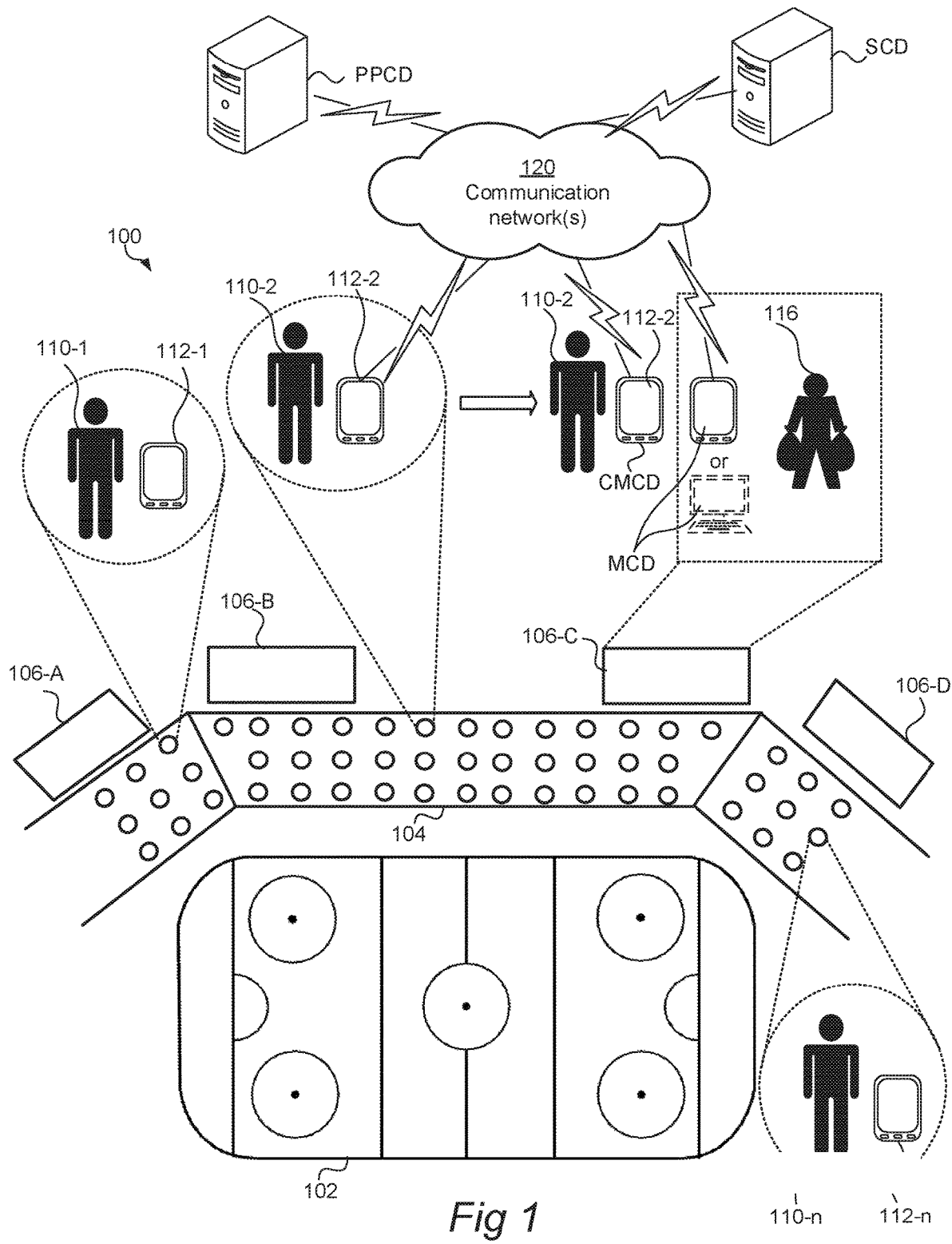
FIG. 1 is a schematic illustration of a communication system for use at an exemplary venue in the form of a hockey arena to facilitate efficient mobile commerce for a potentially very large number of customers using their mobile device to order and pay for articles (order items) offered by a plurality of points of sale or pick-up counters at the venue.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 schematically illustrates a communication system 100 for use at a venue. The communication system 100 facilitates efficient mobile commerce for a potentially very large number of customers 110-1, 110-2, . . . , 110-n using their mobile device 112-1, 112-2, . . . , 112-n to buy articles offered by a plurality of points of sale or pick-up counters 106-A, 106-B, 106-C, 106-D at the venue.

In the illustrated and non-limiting example, the venue is a hockey arena and accordingly includes a hockey rink 102 and a spectator platform 104. In the illustrated example, the customers 110-1-110-n are therefore spectators enjoying a hockey game on the hockey rink 102 and having the possibility to use their mobile devices 112-1-112-n to place orders for pick-up at any of the plurality of points of sale or pick-up counters 106-A-106-D at the venue. Sales assistants may operate the respective points of sale or pick-up counters.

The present invention may however be used with many other types of venues as well, including but not limited to other sport arenas, concerts halls, theatres, cinemas, shopping malls, supermarkets, restaurants, clubs and bars.

The communication system 100 comprises the following, devices:

A customer mobile computing device, CMCD, being a particular mobile device among the mobile devices 112-1-112-n and used by a particular customer among the customers 110-1-110-n to place an order at a particular point of sale or pick-up counter among the plurality of points of sale or pick-up counters 106-A-106-D at the venue. In the following exemplary description, the customer mobile computing device CMCD will be the particular mobile device 112-2, and the particular customer will accordingly be the customer 112-2. The particular point of sale or pick-up counter will be 106-C, as operated by a sales assistant 116.

A merchant computing device, MCD, at the particular point of sale or pick-up counter, see 106-C. The sales assistant 116 operates the merchant computing device MCD. Other embodiments are possible where the particular point of sale or pick-up counter operates automatically and/or by a robot; in such cases there may not be a sales assistant 116.

A server computing device, SCD.

A payment processor computing device, PPCD.

The customer mobile computing device CMCD is a mobile device, such as a mobile terminal, smartphone, tablet computer, personal digital assistant, notebook computer or smartwatch, having an operating system and a processing unit in the form of, for instance, a CPU and/or a DSP. The customer mobile computing device CMCD is programmed to perform its functionality as described in this document by the processing unit executing program instructions of a computer program.

The customer mobile computing device CMCD communicates with the server computing device SCD and payment processor computing device PPCD over one or more communication networks 120 and may, for instance, be compliant with wireless communication pursuant to IEEE 802.11, IEEE 802.15, ZigBee, WirelessHART, WiFi, Bluetooth, WCDMA, HSPA, GSM, UTRAN, UMTS or LTE, or any combination thereof.

The merchant computing device MCD may be a mobile device of a same or similar type as the customer mobile computing device CMCD. Alternatively, the merchant computing device MCD may be a workstation computer, personal computer or laptop computer. The merchant computing device MCD has an operating system and a processing unit in the form of, for instance, a CPU and/or a DSP. The merchant computing device MCD is programmed to perform its functionality as described in this document by the processing unit executing program instructions of a computer program.

To this end, it may be configured to communicate with the server computing device SCD and payment processor computing device PPCD over the one or more communication networks 120 via wireless communication (like the customer mobile computing device CMCD) and/or wired communication compliant with, for instance, TCP/IP.

The server computing device SCD is a server computer, a cluster of such computer devices, or a cloud computing resource or service. It has a processing unit in the form of, for instance, one or more CPUs and/or DSPs, and is programmed to perform its functionality as described in this document by the processing unit executing program instructions of a computer program.

The payment processor computing device PPCD is likewise a server computer, a cluster of such computer devices, or a cloud computing resource or service. It has a processing unit in the form of, for instance, one or more CPUs and/or DSPs, and is programmed to perform its functionality as described in this document by the processing unit executing program instructions of a computer program.

The server computing device SCD and the payment processor computing device PPCD may communicate with each other over the aforementioned or more communication networks 120, for instance by way of TCP/IP communication.

In some embodiments, the server computing device SCD and the payment processor computing device PPCD are implemented by the same server computer, cluster of such computer devices, or cloud computing resource or service. Hence, the server computing device SCD and the payment processor computing device PPCD shall be seen as two logical devices but not necessarily two physically different devices.

Reference is now made to FIG. 2 which is a flowchart diagram illustrating a computerized method 200 of performing a purchase generally according to the invention.

In a first step 210, the customer mobile computing device CMCD communicates with the server computing device SCD to generate an order for the purchase. This will occur upon request by the customer 112 who uses his customer mobile computing device CMCD to select among available order items in an app or similar. Preferably, this also involves choosing the preferred point of sale or pick-up counter 106-C among the plurality of points of sale or pick-up counters 106-A, 106-B, 106-C. 106-D at the venue. Conveniently, the first step 210 may be performed by the customer 112 while being remote from the preferred point of sale or pick-up counter, for instance while being seated on the spectator platform 104 and enjoying the hockey game.

In a second step 220, the server computing device SCD communicates with the payment processor computing device PPCD to perform a first part of a payment transaction for the purchase. The first part of the payment transaction for the purchase involves reserving funds for the purchase. Noticeably, step 220 may be performed already when the customer 112 and the customer mobile computing device CMCD are still at the spatial location where the order was generated in step 210—for instance at his seat on the spectator platform 104. Hence, step 220 for performing the first part of the payment transaction for the purchase is in effect a preprocessing step which will facilitate the subsequent procedure at the point of sale or pick-up counter 106-C (see the following description with reference to step 230 in FIG. 2, and also FIG. 5). An embodiment of the first and second steps 210, 220 will be described later with reference to FIG. 4.

In a third step 230, the merchant computing device MCD performs a digital handshake procedure with the customer mobile computing device CMCD. The digital handshake procedure is seen at 510 in FIG. 5 and involves short-range wireless data communication to verify spatial proximity between the customer mobile computing device CMCD and the merchant computing device MCD. Noticeably, step 230 will be performed when the customer 112 and the customer mobile computing device CMCD have moved from the spatial location where the order was generated in step 210 (e.g. on the spectator platform 104) to the point of sale or pick-up counter 106-C. Such movement can be seen for the customer 112-2 and CMCD 110-2 in FIG. 2. In other words, step 230 is performed spatially as well as temporally different from step 210 (and step 220). An embodiment of the digital handshake procedure will be described later with reference to FIG. 6.

When spatial proximity between the customer mobile computing device CMCD and the merchant computing device MCD has been verified in step 230, the merchant computing device MCD communicates in a fourth step 240 with the server computing device SCD to accept the order.

In response, in a fifth step 250, the server computing device SCD communicates with the payment processor computing device PPCD to perform a second part of the payment transaction.

An embodiment of steps 230, 240 and 250 will be described later with reference to FIG. 5.

The second part of the payment transaction for the purchase involves capturing funds for the purchase. Since the first part of the payment transaction for the purchase (e.g. the reservation of funds) has already been performed in the aforementioned step 220 before the customer 112 and the customer mobile computing device CMCD arrived at the point of sale or pick-up counter 106-C, only the second part of the payment transaction for the purchase will have to be performed when the customer 112 and the customer mobile computing device CMCD is at the point of sale or pick-up counter 106-C.

This represents a considerable improvement in processing efficiency and reduces the risk of bottleneck situations at the point of sale or pick-up counter.

Moreover, this represents an improvement in situations where the customer 112 for some reason fails to actually retrieve the order items he has ordered. Such situations may occur when the customer 112 by mistake goes to another point of sale or pick-up counter at the venue, or is prevented to pick up his order for other reasons, or if the point of sale or pick-up counter suddenly runs empty of one or more of the order items, for instance because of an unexpected peak in demand for a certain order item by many customers targeting the same particular point of sale or pick-up counter. In such situations, if the second part of the payment transaction is not performed, the server computing device SCD or the payment processor computing device PPCD may detect a timeout and cancel the first part of the payment transaction by removing the reservation of funds. The timeout may, for instance, occur when a certain time has lapsed since the order was generated (cf step 210), or since the first part of the payment transaction was performed (cf step 220). As a result, no funds will be withdrawn from the customer, and the risk of user annoyance may be reduced or even eliminated.

Some initial steps to prepare the consumer mobile computing device CMCD for use with the computerized method 200 will now be described with reference to FIG. 3.

Figure 3:
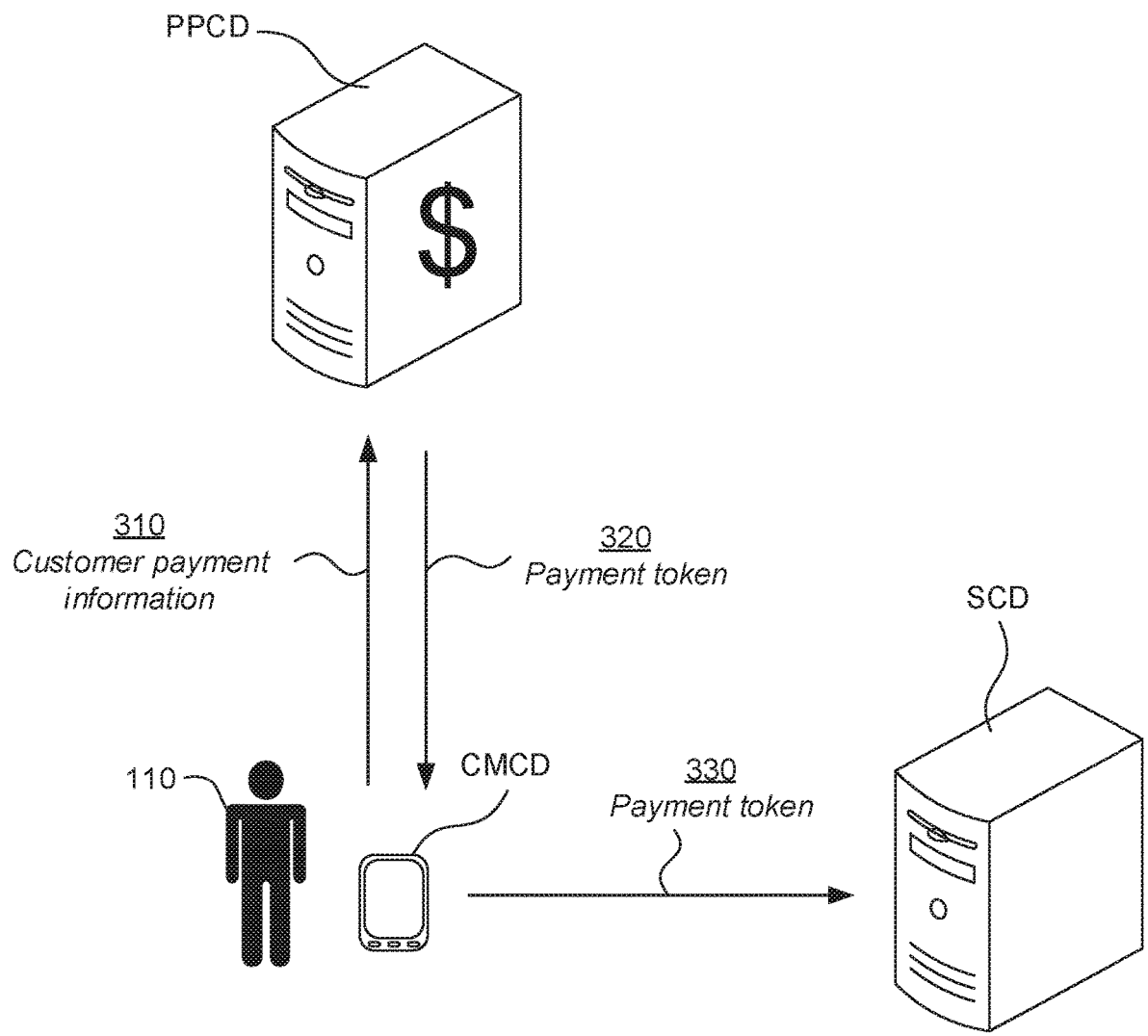
FIG. 3 is a schematic illustration of initial steps according to one embodiment, these initial steps being performed by different devices in the communication system to prepare a consumer mobile computing device for use with the computerized method of performing a purchase.

As seen in FIG. 3, the customer mobile computing device CMCD provides customer payment information 310 to the payment processor computing device PPCD. The customer payment information 310 may be prestored in the customer mobile computing device CMCD or be entered by the customer 110 when step 310 is to be performed.

In response, the payment processor computing device PPCD registers the customer payment information 310 and provides a payment token 320 to the customer mobile computing device CMCD.

In turn, the customer mobile computing device CMCD provides the payment token 330 to the server computing device SCD.

Finally, in response to this, the server computing device SCD registers the customer payment token for future use when performing the first part 420-430 of the payment transaction for the purchase.

Figure 4:
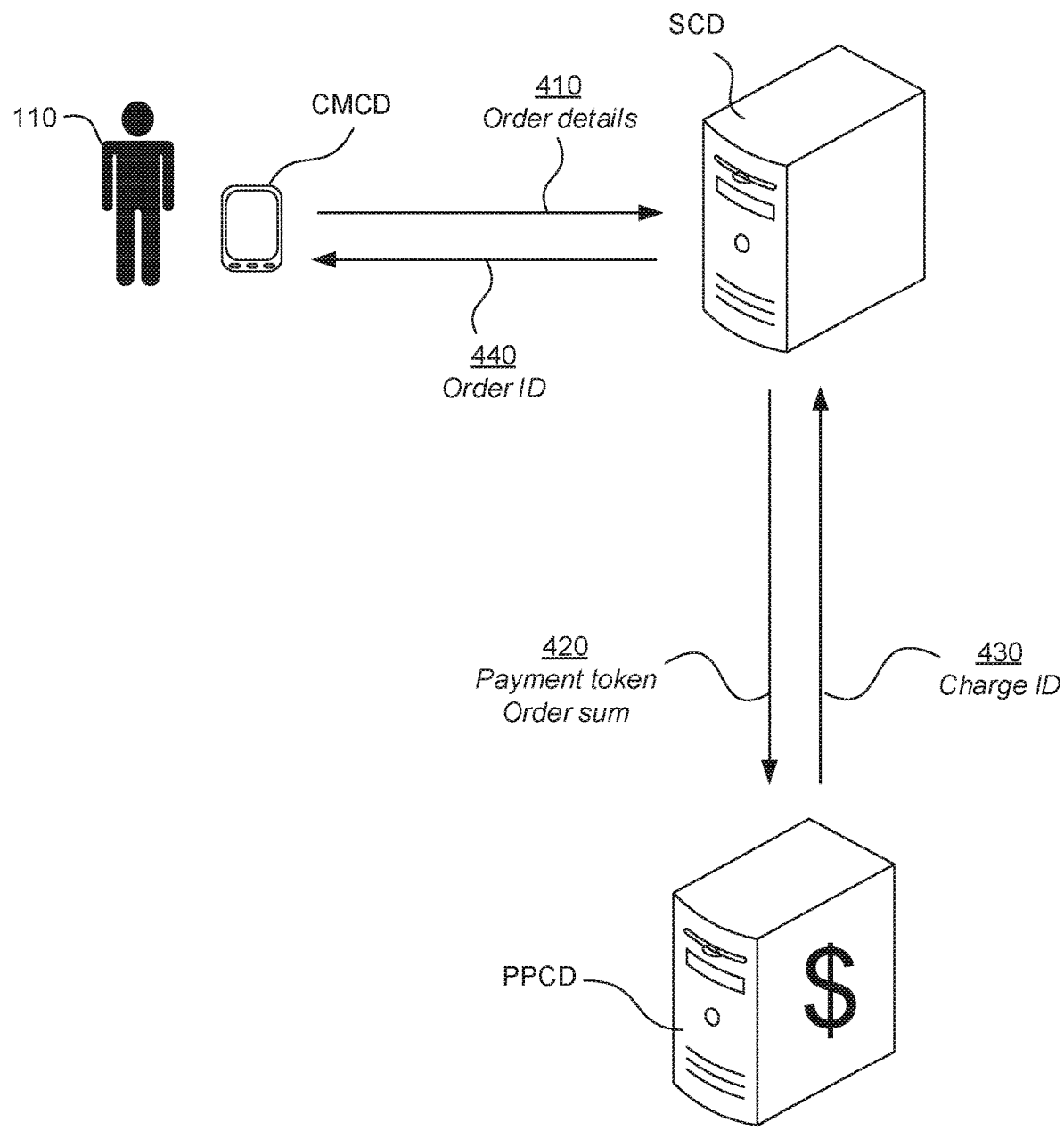
FIG. 4 is a schematic illustration of further steps according to one embodiment, these further steps being performed by different devices in the communication system to perform a first part of a payment transaction for a purchase.

An embodiment of the aforementioned steps 210 and 220 in FIG. 2 is shown in FIG. 4. When the customer mobile computing device CMCD communicates with the server computing device SCD in step 210 to generate an order for the purchase, the customer mobile computing device CMCD will provide order details to the server computing device SCD. See step 410, Order details.

In response, the customer mobile computing device CMCD receives and registers an order identity from the server computing device SCD when the order is generated. See step 440, Order ID.

Moreover, when the server computing device SCD communicates with the payment processor computing device PPCD in step 220 to perform the first part, this involves the following steps as can be seen in FIG. 4:

The server computing device SCD provides the registered payment token to the payment processor computing device PPCD, together with a total order value. See 420, Payment Taken and Order Sum.

Then, based on the provided payment token, the payment processor computing device PPCD executes the first part of the payment transaction for the purchase and responds to the server computing device SCD with a transaction identity. See 430, Charge ID.

As a result, the server computing device SCD registers the transaction identity Charge ID for future use when performing the second part of the payment transaction for the purchase.

Figure 5:
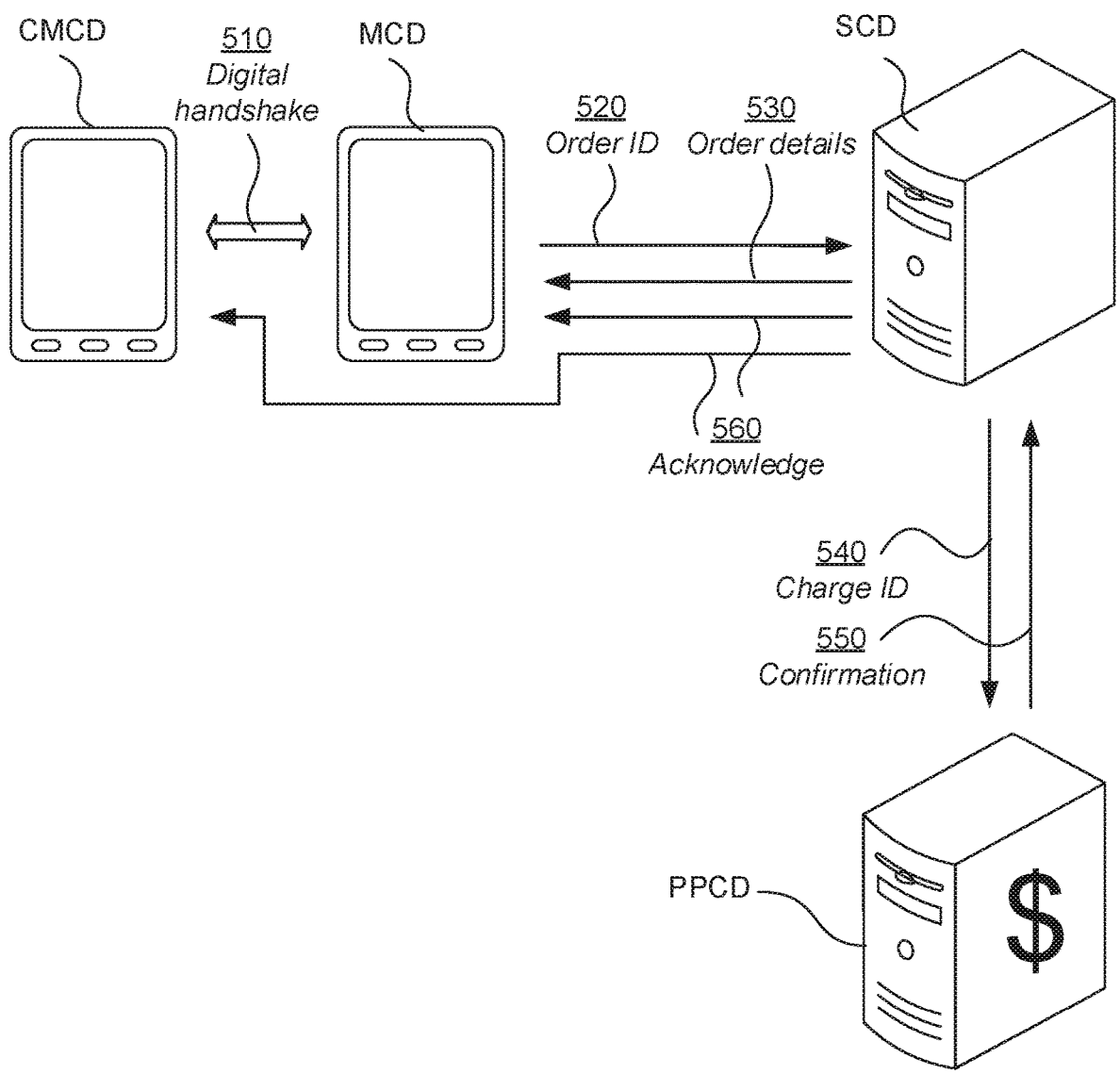
FIG. 5 is a schematic illustration of additional steps according to one embodiment, these additional steps being performed by different devices in the communication system to perform a second part of the payment transaction for the purchase.

An embodiment of the aforementioned steps 230, 240 and 250 in FIG. 2 is shown in FIG. 5. It is recalled that in step 230, the merchant computing device MCD performs a digital handshake procedure with the customer mobile computing device CMCD. This is seen at 510 in FIG. 5 and involves short-range wireless data communication to verify spatial proximity between the customer mobile computing device CMCD and the merchant computing device MCD. The short-range wireless data communication may, for instance, be based on Bluetooth/Bluetooth Low Energy (BLE). In some embodiments it may include beacon-based functionality pursuant to iBeacon, AltBeacon, Eddystone or UriBeacon.

Figure 6:
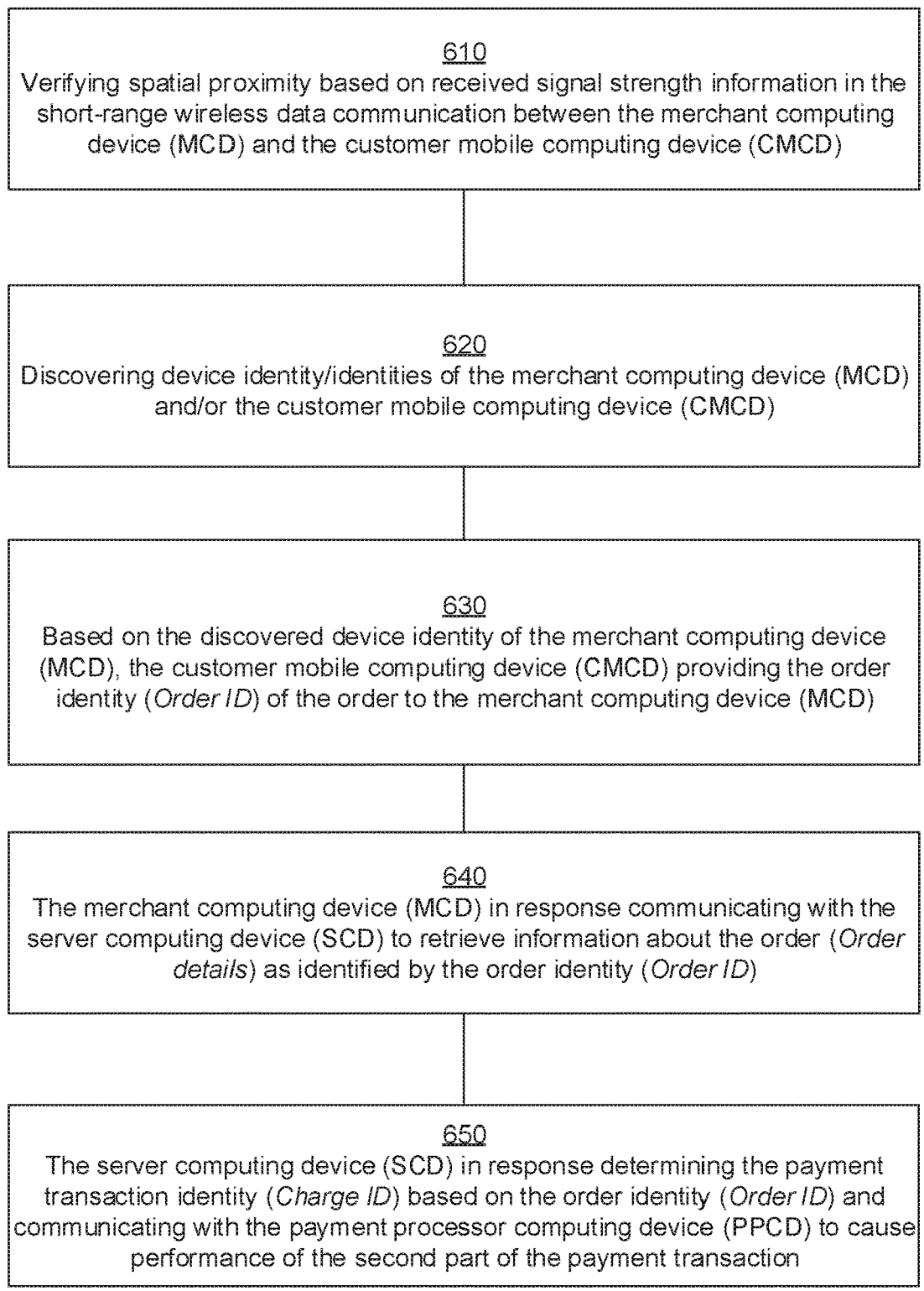
FIG. 6 is a schematic illustration of a digital handshake procedure and resulting activity according to one embodiment, the digital handshake procedure being performed by the consumer mobile computing device and a merchant computing device to cause performance of the second part of the payment transaction.

A more detailed outline of the digital handshake procedure 510 and the resulting activity is given in FIG. 6.

A first step 610 involves verifying spatial proximity based on received signal strength information in the short-range wireless data communication between the merchant computing device MCD and the customer mobile computing device CMCD. This may, for instance, include comparing momentary RSSI values to a threshold value and deciding that spatial proximity has been verified when the threshold value is exceeded. Step 610 may be performed between the merchant computing device MCD and the customer mobile computing device CMCD exclusively, or it may alternatively involve also a third party in the form of a server resource to assist in the verification of spatial proximity.

When spatial proximity has been verified in step 610, a second step 620 involves discovering at least a device identity of the merchant computing device. In some embodiments, step 620 may involve discovering respective device identities of the merchant computing device MCD and the customer mobile computing device CMCD. The device identity or identities may be identities on an application program level (for instance set and administered from an app in the or each device), identities previously provided by a server resource (such as, for instance, the server computing device (SCD)), or identities associated with hardware in the or each device (such as, for instance a Bluetooth communication address).

Then, based on the discovered device identity of the merchant computing device MCD, the customer mobile computing device CMCD provides the order identity Order ID of the order to the merchant computing device MCD in a third step 630. Also see 520 in FIG. 5.

In response, in a fourth step 640 the merchant computing device MCD communicates with the server computing device (SCD) to retrieve information about the order as identified by the order identity Order ID, See FIG. 5, 530, Order details.

In response, in a fifth step 650 which also corresponds to step 250 in FIG. 2, the server computing device SCD determines the payment transaction identity Charge ID based on the order identity Order ID and communicates with the payment processor computing device PPCD to cause performance of the second part of the payment transaction. As can be seen in more detail at 540 and 550 in FIG. 5, this involves the following:

The server computing device SCD retrieves the registered the transaction identity Charge ID and provides it to the payment processor computing device PPCD. Based on the provided transaction identity Charge ID, the payment processor computing device PPCD executes the second part of the payment transaction for the purchase.

Following this, the payment processor computing device PPCD confirms successful performance of the second part of the payment transaction to the server computing device SCD. See 550 in FIG. 5, Confirmation. The server computer device SCD in response communicates a payment completion acknowledgement, see 560, Acknowledge, to the customer mobile computing device CMCD and the merchant computing device MCD.

In response to receiving the payment completion acknowledgement Acknowledge at 560 in FIG. 5, the customer mobile computing device CMCD and the merchant computing device MCD may each provide a respective user feedback in a local user interface of each device. This may, for instance, involve presenting a status update or a digital message on a display screen.

In one embodiment, the venue is a restaurant, club, bar, pop/rock concert, etc, and the merchant computing device MCD is a mobile device which is carried by the sales assistant (e.g. a waitress) to the customer to deliver the order (e.g. food, drinks) and perform the payment transaction. Accordingly, the point of sale in this embodiment is not at a spatially stationary location, instead it is represented by the sales assistant's current mobile location at the venue. The customer mobile computing device CMCD may thus remain at a stationary location in this embodiment.

The invention has been described above in detail with reference to embodiments thereof. However, as is readily understood by those skilled in the art, other embodiments are equally possible within the scope of the present invention, as defined by the appended claims.

The invention claimed is:

1. A computerized method of performing a purchase, comprising:
    a customer mobile computing device communicating with a server computing device to generate an order for the purchase;
    the server computing device communicating with a payment processor computing device to perform a first part of a payment transaction for the purchase, wherein the first part of the payment transaction involves reserving funds for the purchase;
    a merchant computing device performing a digital handshake procedure with the customer mobile computing device, the digital handshake procedure involving short-range wireless data communication to verify spatial proximity between the customer mobile computing device and the merchant computing device;
    when spatial proximity has been verified, the merchant computing device communicating with the server computing device to accept the order;
    the server computing device communicating with the payment processor computing device to perform a second part of the payment transaction, wherein the second part of the payment transaction involves capturing funds for the purchase;
    wherein the method further includes initial steps of
        the customer mobile computing device providing customer payment information to the payment processor computing device;
        the payment processor computing device in response registering the customer payment information and providing a payment token to the customer mobile computing device;
        the customer mobile computing device in response providing the payment token to the server computing device; and
        the server computing device in response registering the customer payment token for future use when performing the first part of the payment transaction for the purchase; and
    wherein the server computing device communicating with the payment processor computing device to perform the first part of the payment transaction for the purchase involves
        the server computing device providing the registered payment token to the payment processor computing device;
        based on the provided payment token, the payment processor computing device executing the first part of the payment transaction for the purchase and responding to the server computing device with a transaction identity; and
        the server computing device registering the transaction identity for future use when performing the second part of the payment transaction for the purchase.

2. The method as defined in claim 1, further comprising:
    the server computing device or the payment processor computing device detecting a timeout if the second part of the payment transaction is not performed, and cancelling the first part of the payment transaction by removing the reservation of funds.

3. The method as defined in claim 1, wherein the server computing device communicating with the payment processor computing device to perform the second part of the payment transaction involves:
    the server computing device retrieving the registered the transaction identity and providing it to the payment processor computing device; and
    based on the provided transaction identity, the payment processor computing device executing the second part of the payment transaction for the purchase.

4. The method as defined in claim 3, further comprising:
    the payment processor computing device confirming successful performance of the second part of the payment transaction to the server computing device; and
    the server computing device in response communicating a payment completion acknowledgement to the customer mobile computing device and the merchant computing device.

5. The method as defined in claim 4, further comprising:
    in response to receiving the payment completion acknowledgement, the customer mobile computing device and the merchant computing device each providing a user feedback in a local user interface of each device.

6. The method as defined in claim 1, wherein:
the customer mobile computing device receives and registers an order identity when the order is generated;
the customer mobile computing device provides the order identity to the merchant computing device when performing the digital handshake procedure; and
the merchant computing device provides the order identity to the server computing device when communicating to accept the order.

7. The method as defined in claim 1, wherein the digital handshake procedure involves verifying spatial proximity based on received signal strength information in the short-range wireless data communication between the merchant computing device and the customer mobile computing device.

8. The method as defined in claim 7, further comprising initial steps of:
the customer mobile computing device providing customer payment information to the payment processor computing device;
the payment processor computing device in response registering the customer payment information and providing a payment token to the customer mobile computing device;
the customer mobile computing device in response providing the payment token to the server computing device;
the server computing device in response registering the customer payment token for future use when performing the first part of the payment transaction for the purchase;
the customer mobile computing device receiving and registering an order identity when the order is generated;
the customer mobile computing device providing the order identity to the merchant computing device when performing the digital handshake procedure; and
the merchant computing device providing the order identity to the server computing device when communicating to accept the order;
wherein the digital handshake procedure further involves, when spatial proximity has been verified:
discovering at least a device identity of the merchant computing device; and
based on the discovered device identity of the merchant computing device, the customer mobile computing device providing the order identity of the order to the merchant computing device, and
wherein the method further involves:
the merchant computing device in response communicating with the server computing device to retrieve information about the order as identified by the order identity; and
the server computing device in response determining the transaction identity based on the order identity and communicating with the payment processor computing device to cause performance of the second part of the payment transaction.

9. A non-transitory computer readable medium having stored thereon a computer program having program instructions for causing performance of the functionality of the customer mobile computing device in the method of claim 1 when the program instructions are executed by a processing unit.

10. A non-transitory computer readable medium having stored thereon a computer program having program instructions for causing performance of the functionality of the merchant computing device in the method of claim 1 when the program instructions are executed by a processing unit.

11. A non-transitory computer readable medium having stored thereon a computer program having program instructions for causing performance of the functionality of the server computing device in the method of claim 1 when the program instructions are executed by a processing unit.

12. A non-transitory computer readable medium having stored thereon a computer program having program instructions for causing performance of the functionality of the payment processor computing device in the method of claim 1 when the program instructions are executed by a processing unit.

13. A communication system comprising:
a customer mobile computing device;
a merchant computing device;
a server computing device; and
a payment processor computing device;
wherein the customer mobile computing device and the server computing device are configured for communicating to generate an order for the purchase;
wherein the server computing device and the payment processor computing device are configured for communicating to perform a first part of a payment transaction for the purchase, wherein the first part of the payment transaction involves reserving funds for the purchase;
wherein the merchant computing device and the customer mobile computing device are configured for performing a digital handshake procedure, the digital handshake procedure involving short-range wireless data communication to verify spatial proximity between the customer mobile computing device and the merchant computing device;
wherein the merchant computing device and the server computing device are configured, when spatial proximity has been verified, for communicating to accept the order;
wherein the server computing device and the payment processor computing device are configured for communicating to perform a second part of the payment transaction, wherein the second part of the payment transaction involves capturing funds for the purchase;
wherein the communication system is further configured for
the customer mobile computing device providing customer payment information to the payment processor computing device;
the payment processor computing device in response registering the customer payment information and providing a payment token to the customer mobile computing device;
the customer mobile computing device in response providing the payment token to the server computing device; and
the server computing device in response registering the customer payment token for future use when performing the first part of the payment transaction for the purchase; and
wherein performing the first part of the payment transaction for the purchase involves
the server computing device providing the registered payment token to the payment processor computing device;

based on the provided payment token, the payment processor computing device executing the first part of the payment transaction for the purchase and responding to the server computing device with a transaction identity; and the server computing device registering the transaction identity for future use when performing the second part of the payment transaction for the purchase.

14. The communication system as defined in claim 13, wherein the server computing device or the payment processor computing device is configured for detecting a timeout if the second part of the payment transaction is not performed, and for cancelling the first part of the payment transaction by removing the reservation of funds.

* * * * *